United States Patent
Kawachi

(10) Patent No.: US 6,170,296 B1
(45) Date of Patent: Jan. 9, 2001

(54) MECHANISM FOR DRIVING PLUNGERS OF METAL MOLDS IN A BOTTLE-MAKING MACHINE

(75) Inventor: Fumio Kawachi, Ogaki (JP)

(73) Assignee: Nihon Taisanbin Kogyo Kabushiki Kaisha, Gifu-ken (JP)

( * ) Notice: Under 35 U.S.C. 154(b), the term of this patent shall be extended for 0 days.

(21) Appl. No.: 09/178,513

(22) Filed: Oct. 26, 1998

(30) Foreign Application Priority Data

Nov. 27, 1997 (JP) .................................................. 9-334179

(51) Int. Cl.$^7$ .................................................. C03B 11/16
(52) U.S. Cl. .................................. 65/318; 65/159; 65/322; 65/362; 74/89.17; 74/665 GB; 74/665 GF; 475/220; 475/230; 475/248
(58) Field of Search ........................ 74/89.17, 665 GB, 74/665 GF; 475/220, 230, 248; 65/159, 318, 322, 362

(56) References Cited

U.S. PATENT DOCUMENTS

| | | | |
|---|---|---|---|
| 943,858 | * 12/1909 | Betz et al. ............................. | 65/318 |
| 1,802,031 | * 4/1931 | Moorshead ............................. | 65/318 |
| 2,743,625 | * 5/1956 | Moffett ................................. | 475/98 |
| 2,922,319 | * 1/1960 | Burner ................................. | 475/90 |
| 4,402,238 | * 9/1983 | Craig ................................... | 74/710 |
| 4,856,372 | * 8/1989 | Williamson ............................ | 74/710 |
| 5,098,355 | * 3/1992 | Long .................................. | 475/220 |
| 5,247,856 | * 9/1993 | Cuypers .............................. | 74/665 F |
| 5,501,636 | * 3/1996 | Janke et al. ........................... | 464/48 |
| 5,941,790 | * 8/1999 | Steen et al. ........................... | 475/230 |

* cited by examiner

Primary Examiner—Sean Vincent
(74) Attorney, Agent, or Firm—Arent Fox Kintner Plotkin & Kahn, PLLC

(57) ABSTRACT

A single drive mechanism for simultaneously driving plungers of a plurality of metal molds in each of the sections by employing an output cost-efficient electric motor as a mechanism for driving the plungers. The novel plunger drive mechanism makes it possible to correctly and efficiently mold the articles without causing defect even when the glass material is fed in varying amounts into the metal molds. In molding a glass material thrown into the metal molds by moving the plungers forward, a mechanism moves the plungers forward with a predetermined torque and then backward. The mechanism includes a drive motor, a main gear, planetary bevel gears, a first driven wheel member, a second driven wheel member, a first drive pinion, a second drive pinion, a first main drive member, and a second main drive member.

6 Claims, 4 Drawing Sheets

MECHANISM FOR DRIVING PLUNGERS OF METAL MOLDS IN A BOTTLE-MAKING MACHINE

BACKGROUND OF THE INVENTION

1. Field of the Invention

The present invention relates to a mechanism for driving plungers of metal molds in a bottle-making machine. More specifically, the invention relates to a mechanism for driving plungers in order to mold a glass material thrown into the metal molds, in the sections of a bottle-making machine, into desired shapes.

2. Prior Art

A bottle-making machine usually has 6 to 12 sections, and in each section are arranged 1 to 4 metal molds (coarse molds) depending upon the size of the metal molds (due to limitation in space). A glass material (gob) is thrown from a glass material feeder (gob feeder) into the metal molds in each of the sections, successively, and the glass material is molded into articles (parisons) of a desired shape by the operation of a plunger provided for each of the metal molds. So far, an air cylinder has been provided for the plunger of each of the metal molds, and is advanced with a predetermined torque to effect the molding in each of the metal molds.

Though the air cylinder has heretofore been used as a mechanism for driving the plunger as described above, the output cost of the air cylinder is never good and is, usually, lower by 20 to 50% than the output cost of an electric motor. So far, furthermore, independent mechanisms are necessary for driving the plungers of the metal molds in each of the sections. As the number of the metal molds increases from two to three or four, the apparatus becomes complex and the control system becomes complex, too.

It has already been proposed in, for example, Japanese Unexamined Patent Publication (Kokai) No. 9-142853 to actuate the plungers in the bottle-making machine of this kind by using an electric motor (servo motor). According to this prior art, a servo motor is arranged in each metal mold to actuate the plunger, and each metal mold is provided with a mechanism for detecting the position of the plunger to effect the molding while detecting the position at where the pressure exerted by the plunger terminates.

According to this prior art, however, each plunger in each metal mold is provided with a servo motor, which is a drive mechanism in place of the conventional air cylinder, without contributing to simplifying the apparatus or the control operation therefor.

According to this prior art, furthermore, the molding is effected while detecting a position where the pressure exerted by the plunger terminates. Such a control operation may be effective when the amounts of the glass material in the metal molds are strictly equal to each other. In practice, however, the glass material (gob) is supplied in varying amounts from the glass material feeder (gob feeder) to the metal molds. Depending upon the controlled positions of the plungers, therefore, the molding becomes defective due to lack of pressure when the amount of the material is small, or the molding becomes defective such as mold opening due to excess pressure when the amount of the material is great.

SUMMARY OF THE INVENTION

The present invention was accomplished in view of the above-mentioned problems, and its object is to provide a single mechanism for simultaneously driving the plungers of a plurality of metal molds in each of the sections by employing an output cost-efficient electric motor as a mechanism for driving the plungers. Another object of the present invention is to provide a quite novel mechanism for driving the plungers, which makes it possible to correctly and efficiently effect the molding without causing defect in the molding despite the glass material being fed in varying amounts into the metal molds.

In order to solve the above-mentioned problems, the invention of claim 1 is concerned with a mechanism for driving plungers of metal molds in a bottle-making machine in order to move the plungers forward and backward with a predetermined torque in molding a glass material thrown into the metal molds into a predetermined shape by moving the plungers forward, comprising:

a reversible drive motor so adjusted as to come into a halt upon receiving a predetermined load;

a main gear that rotates in mesh with a drive gear of said drive motor;

planetary bevel gears formed integrally with said main gear via arms, which revolve in a direction in which said main gear rotates, and rotate in a direction at right angles with the direction of rotation of said main gear upon receiving a predetermined load;

a first driven wheel member which rotates in a direction in which said planetary bevel gears revolve, and has a first driven bevel gear portion that meshes with said bevel gears and has a rotary shaft thereof;

a second driven wheel member arranged concentric with said first driven bevel gear portion being opposed thereto, which rotates in a direction in which said planetary bevel gear portion revolves, and has a second driven bevel gear portion that meshes with said bevel gears and has a rotary shaft thereof;

a first drive pinion detachably mounted on the rotary shaft of said first driven wheel member and rotating together therewith;

a second drive pinion detachably mounted on the rotary shaft of said second driven wheel member and rotating together therewith;

a first main drive member for driving a plunger having a rack portion that meshes with said first drive pinion; and a second main drive member for driving a plunger having a rack portion that meshes with said second drive pinion.

The invention of claim 2 is concerned with a mechanism for driving plungers of metal molds in a bottle-making machine of claim 1, wherein said first drive pinion and said second drive pinion are detachably attached, by spline fitting, to the rotary shafts of said first driven wheel member and of said second driven wheel member.

The invention of claim 3 is concerned with a mechanism for driving plungers of metal molds in a bottle-making machine of claim 1, wherein provision is made of a stopper pin for halting the rotation of either said first driven wheel member or said second driven wheel member.

The invention of claim 4 is concerned with a mechanism for driving plungers of metal molds in a bottle-making machine of claim 1 having two metal molds, wherein provision is made of a first plunger drive member and a second plunger drive member for driving the plungers for the two metal molds, said first plunger drive member being directly driven by said first main drive member and said second plunger drive member being directly driven by said second main drive member.

The invention of claim 5 is concerned with a mechanism for driving plungers of metal molds in a bottle-making machine of claim 1 having three metal molds, wherein provision is made of a first plunger drive member, a second plunger drive member and a third plunger drive member for driving the plungers for the three metal molds, said first main drive member and said second main drive member having a first auxiliary pinion and a second auxiliary pinion that rotate in the directions of moving forward and backward when a predetermined load is exerted thereon, said first plunger drive member having a rack portion that meshes with said first auxiliary pinion, said second plunger drive member having a rack portion that meshes with said first auxiliary pinion and a rack portion that meshes with said second pinion, and said third plunger drive member having a rack portion that meshes with said second auxiliary pinion.

The invention of claim 6 is concerned with a mechanism for driving plungers of metal molds in a bottle-making machine of claim 1 having four metal molds, wherein provision is made of a first plunger drive member, a second plunger drive member, a third plunger drive member and a fourth plunger drive member for driving the plungers for the four metal molds, said first main drive member and said second main drive member having a first auxiliary pinion and a second auxiliary pinion that rotate in the directions of moving forward and backward when a predetermined load is exerted thereon, said first plunger drive member having a rack portion that meshes with said first auxiliary pinion, said second plunger drive member having a rack portion that meshes with said first auxiliary pinion, said third plunger drive member having a rack portion that meshes with said second auxiliary pinion, and said fourth plunger drive member having a rack portion that meshes with said second auxiliary pinion.

DESCRIPTION OF THE PREFERRED EMBODIMENTS

Figure 1:
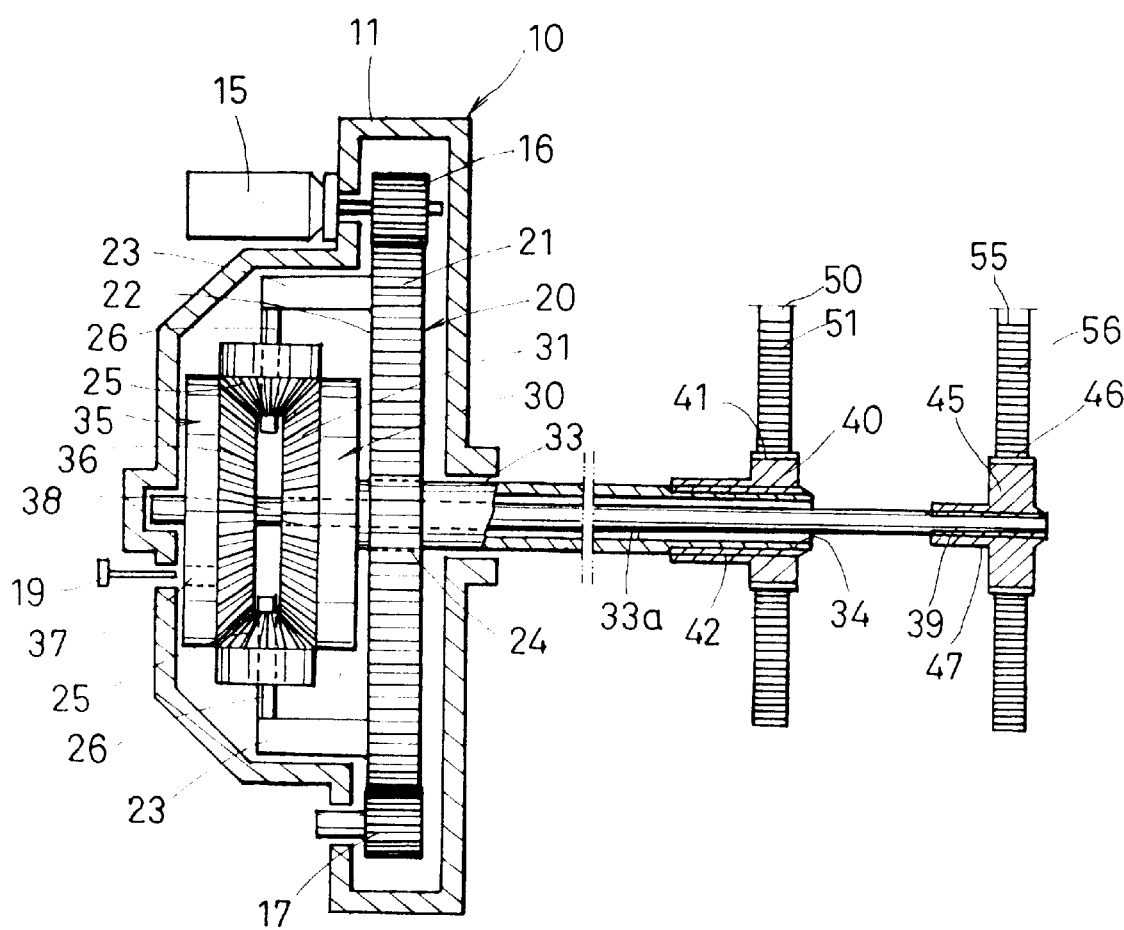
FIG. 1 is a sectional view of major portions illustrating the main body of a mechanism for driving plungers according to an embodiment of the present invention.

First, the mechanism for driving plungers of the present invention will be described with reference to FIG. 1. As will become obvious from the following description, the mechanism (main mechanical portion) 10 for driving plungers shown in FIG. 1 works to move the plungers forward with a predetermined torque and then move the plungers backward in a process of molding a glass member thrown into the metal molds into a predetermined shape by moving the plungers forward.

As shown, the main mechanical portion 10 includes a drive motor 15, a main gear 20, planetary bevel gears 25, a first driven wheel member 30, a second driven wheel member 35, a first drive pinion 40, a second drive pinion 45, a first main drive member 50 and a second main drive member 55. These portions will now be described.

The drive motor 15 works as a drive source for the mechanism for driving plungers of the present invention, and is a reversible drive motor which is adjusted to come into a halt when a predetermined load is exerted thereon. Such a motor has been widely known as represented by a servo motor of which the torque can be adjusted. The drive motor 15 in this embodiment is a servo motor capable of setting a predetermined torque being controlled by a voltage, a current or a pulse. The drive motor 15 is mounted on a casing 11, and its drive gear 16 is in mesh with a gear portion 21 of the main gear 20.

As shown, the main gear 20 has a disk-like main body 22. On the outer periphery of the disk-like main body 22 is engraved the gear portion 21 that meshes with the drive gear 16 of the drive motor 15. The main gear 20 is so installed that the directions of rotation thereof are in agreement with the directions in which the plungers move forward and backward.

In FIG. 1, reference numeral 17 denotes an auxiliary gear that meshes with the gear portion 21 of the main gear 20 and is used, as required, for turning the main gear 20 by manual operation by coupling a crank lever that is not shown at the time of, for example, accomplishing adjustment.

The planetary bevel gears 25 are provided integrally with the main gear 20 via arms 23, revolve in a direction in which the main gear 20 rotates, and rotate in a direction at right angles with the direction in which the main gear 20 rotates upon receiving a predetermined load. In this embodiment, two planetary bevel gears 25, 25 are provided via two arms 23, 23 erected being opposed to each other on one surface of the disk-like body 22 of the main gear 20. The planetary bevel gears 25 are so constituted as to rotate when a predetermined load is exerted thereon, i.e., when a load greater than a torque required for the molding is exerted on the plungers of the metal molds. Reference numeral 26 denotes rotary shafts of the planetary bevel gears 25.

The first driven wheel member 30 rotates in a direction in which the planetary bevel gears 25 revolve, has a first driven bevel gear portion 31 that meshes with the bevel gears 25 and has a rotary shaft 33 thereof. The rotary shaft 33 of the first driven wheel member 30 is arranged penetrating through the disk-like main body 22 of the main gear 20. Reference numeral 24 denotes a through hole formed penetrating through the main gear body 22.

The second driven wheel member 35 is arranged being opposed to the first driven wheel member 30 and concentric therewith, rotates in the direction in which the planetary bevel gears 25 revolve, has a second driven bevel gear portion 36 that meshes with the bevel gears 25 and has a rotary shaft 38 thereof. As shown, the rotary shaft 38 of the second driven wheel member 35 is inserted in the through hole 33a of the rotary shaft 33 of the first driven bevel gear portion 31.

The first drive pinion 40 is detachably attached to the rotary shaft 33 of the first driven wheel member 30, and rotates together with the first driven wheel member 30.

The second drive pinion 45 is detachably attached to the rotary shaft 38 of the second driven wheel member 35, and rotates together with the second driven wheel member 35.

Mounting portions 42 and 47 of the first drive pinion 40 and of the second drive pinion 45 are of the spline-fitting structure so as to be detachably attached to the rotary shafts 33 and 38, as shown in FIG. 1. The detachable structure and, particularly, the releasable spline-fitting structure, makes it possible to simply and easily change the preparatory work inclusive of changing the number of the metal molds in each section.

The first main drive member 50 is for driving the plunger of the metal mold, and has a rack portion 51 that meshes with the first drive pinion 40.

Similarly, the second main drive member 55 actuates the plunger of another metal mold and has a rack portion 56 that meshes with the second drive pinion 45.

The first main drive member 50 and the second main drive member 55 are coupled to a plunger drive member to actuate a plunger for a metal mold, to actuate the plungers for the two metal molds, or to actuate the plungers for the three metal mold or for the four metal molds via the first auxiliary pinion and the second auxiliary pinion as will be described later.

In the main mechanical portion 10 as described above, the rotation of the drive motor 15 is transmitted to the first main drive member 50 and to the second main drive member 55 for driving the plungers through the main gear 20, planetary bevel gears 25, first driven wheel member 30 and second driven wheel member 35, first drive pinion 40 and second drive pinion 45. Among them, the main gear 20, planetary bevel gears 25, first driven wheel member 30 and second driven wheel member 35 constitute a so-called differential mechanism.

That is, the first driven wheel member 30 and the second driven wheel member 35 are rotated by the planetary bevel gears 25 that revolve together with the main gear 20, simultaneously and integrally therewith. When a load greater than a predetermined value is exerted on either one driven wheel member (e.g., on the first driven wheel member 30) between the first driven wheel member 30 and the second driven wheel member 35, i.e., when a load greater than a torque required for the molding is exerted on the plunger of the main drive member 50 driven by the wheel member 30, the planetary bevel gears 25 start rotating relative to the driven wheel member 30, so that the rotation of the main gear 20 is halted. The rotation of the main gear 20 is transmitted to the other driven wheel member 35 due to the revolution of the planetary bevel gears 25. When both the first driven wheel member 30 and the second driven wheel member 40 are halted by a predetermined load, the drive motor 15 itself comes into a halt due to an excess of torque.

Even when different loads are exerted on the first main drive member 50 and on the second main drive member 55 driven by the first driven wheel member 30 and by the second driven wheel member 35 as described above, the operation continues until the two main drive members 50 and 55 receive with the predetermined load owing to the rotation and revolution of the planetary bevel gears 25. Accordingly, despite the glass material being fed in varying amounts into the metal molds, the plungers are moved forward with a predetermined pressure at all times, and the articles are correctly and efficiently molded without defects that result from insufficient pressure or excessive pressure of the plungers.

Concretely described below is the mechanism of the present invention to meet the number of the metal molds arranged in each of the sections.

In the mechanism (main mechanical portion) 10 for driving plungers of the present invention as described above, the first main drive member 50 and(or) the second main drive member 55 are provided with the plungers, the glass material (gob) fed from the glass material feeder (gob feeder) is pressed in the metal molds (coarse molds) with a predetermined torque, in order to form articles (parisons) of a predetermined shape complying with a cavity shape in the metal molds. As described earlier, the metal molds are arranged generally in a number of 1 to 2, or 3 to 4 in each of the sections of the bottle-making machine from the standpoint of space.

Mechanism for a Metal Mold

A metal mold for molding a relatively large article is arranged in a number of only one due to limitation in space. When a single plunger for a single metal mold is to be driven, the rotation of either the first driven wheel member 30 or the second driven wheel member 35 is halted by a stopper pin.

In this embodiment as shown in FIG. 1, a releasable stopper pin 19 stops the rotation of the second driven wheel member 35. When the rotation of the second driven wheel member 35 is stopped by the stopper pin 19, the planetary bevel gears 25 rotate and revolve, so that the rotation of the main gear 20 is transmitted to the first driven wheel member 35 only and that the first driven wheel member 35 is rotated. The rotation of the first driven wheel member 35 is transmitted, through the first drive pinion 40, to move the first main drive member 50 forward and backward, thereby to drive the plunger for a single metal mold (not shown) coupled to the first main drive member 50.

When the first driven wheel member 30 receives a load greater than a predetermined value, i.e., receives a load greater than a torque required for the molding while the plunger of the main drive member 50 is moving forward being driven by the driven wheel member 30, the torque set to the drive motor 15 is exceeded; i.e., the drive motor 15 ceases to operate. Thereafter, the drive motor 15 rotates reverse to move the plunger back.

Mechanism for Two Metal Molds

Figure 2:
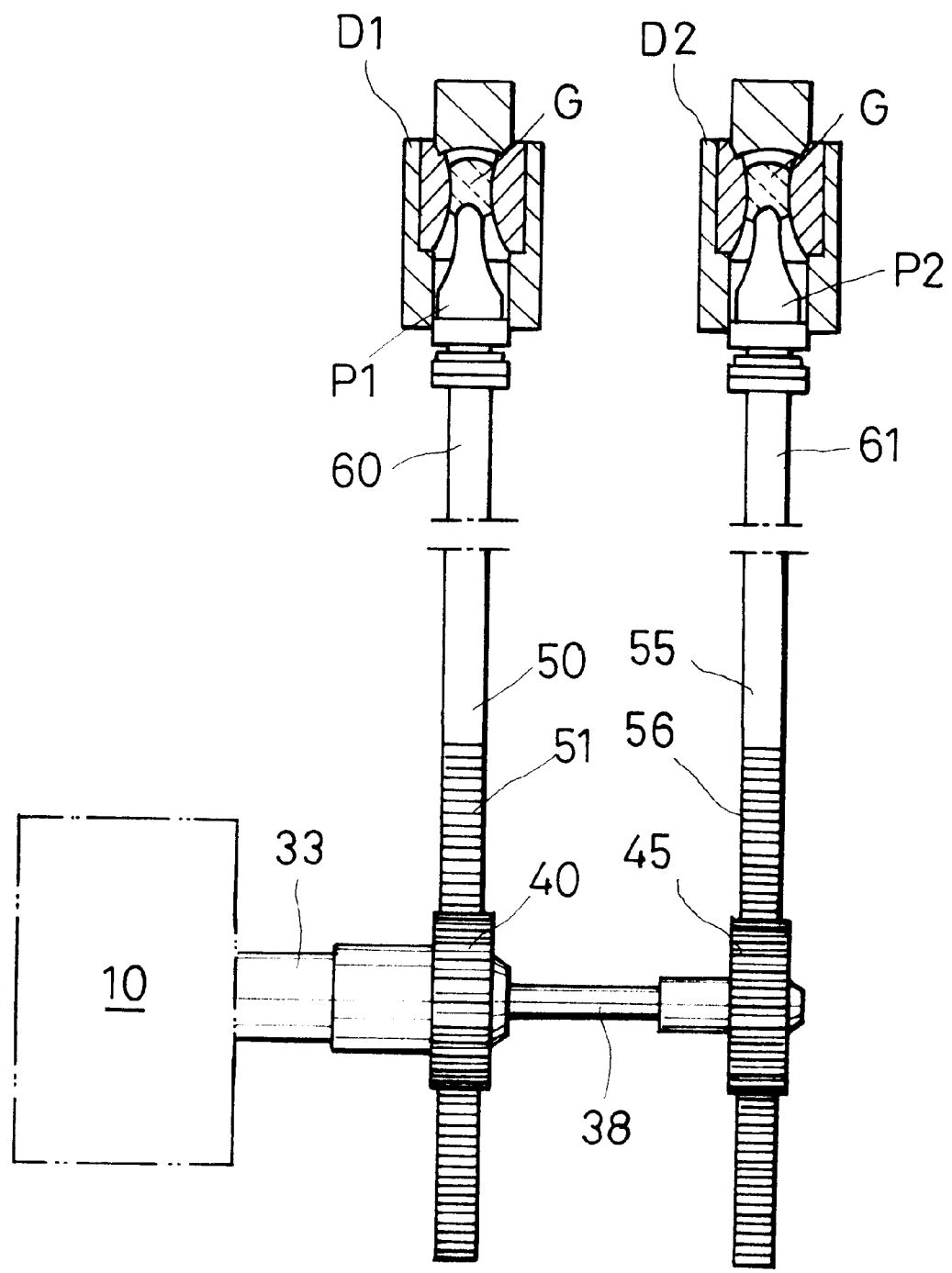
FIG. 2 is a sectional view of major portions illustrating the mechanism for driving plungers for the two metal molds.

FIG. 2 illustrates a mechanism for driving the plungers P1 and P2 for the two metal molds D1 and D2.

According to the invention shown in FIG. 2, the main mechanical portion 10 constituted by the differential mechanism is provided with a first plunger drive member 60 and a second plunger drive member 61 for driving the plungers P1 and P2 for the two metal molds D1 and D2.

In this embodiment, the first plunger drive member 60 is coupled to, or integrally formed with, the first main drive member 50, and the second plunger drive member 61, too, is similarly coupled to, or integrally formed with, the second main drive member 55, so as to be directly driven by the main drive members 50 and 55, respectively. The first plunger drive member 60 and the second plunger drive member 61 are provided, at their ends, with the plungers P1 and P2 that move forward and backward simultaneously relative to the metal molds D1 and D2.

As the plungers P1 and P2 move forward, the glass material (gob) G in the metal molds D1 and D2 is pressed and is molded into a predetermined shape. Here, as the plungers P1 and P2 move forward, a load is produced and is transmitted to the differential mechanism in the main mechanical portion 10. As described above, when a load greater than a predetermined value is exerted on either the first driven wheel member 30 or the second driven wheel member 35, the planetary bevel gears 25 rotate to halt the rotation of the driven wheel member. The other driven wheel member which is not yet producing the predetermined load continues to rotate owing to the revolution of the planetary bevel gears 25. When the load greater than the predetermined value is exerted on both the first driven wheel member 30 and the second driven wheel member 35, the torque set to the drive motor 15 is exceeded; i.e., the drive motor 15 ceases to operate, and the entire apparatus is halted.

After the forward motion of the plungers P1 and P2 has been completed, the drive motor 15 rotates reverse so that the plungers P1 and P2 move away from the metal molds D1 and D2.

Mechanism for Three Metal Molds

Figure 3:
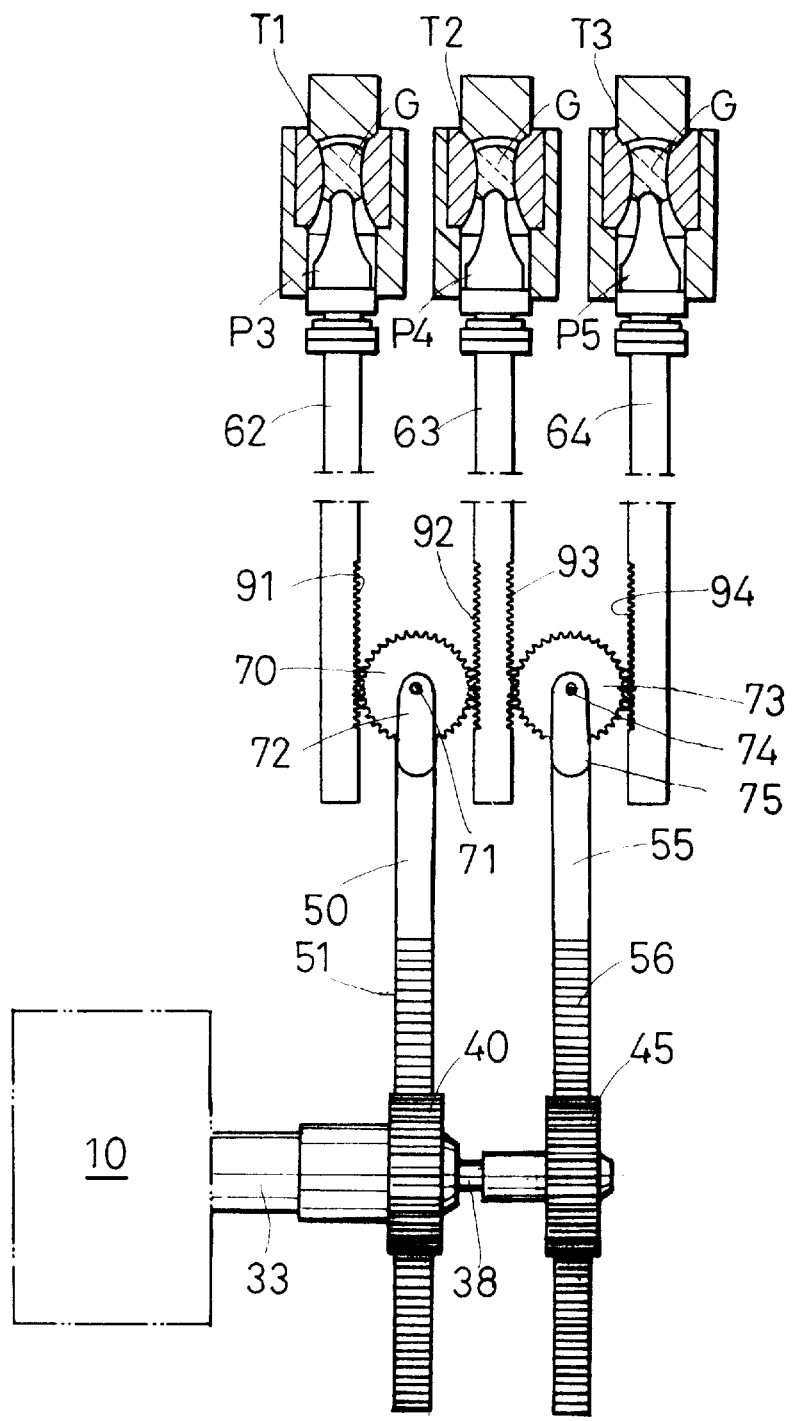
FIG. 3 is a sectional view of major portions illustrating the mechanism for driving plungers for the three metal molds.

FIG. 3 illustrates a mechanism for driving the plungers P3, P4 and P5 for the three metal molds T1, T2 and T3.

In the invention as shown in FIG. 3, provision is made of a first plunger drive member 62, a second plunger drive member 63 and a third plunger drive member 64 for driving the plungers P3, P4 and P5 for the three metal molds T1, T2 and T3. Furthermore, the first main drive member 50 and the second main drive member 55 in the main mechanical portion 10 are provided with a first auxiliary pinion 70 and a second auxiliary pinion 73 that rotate in the directions of moving forward and backward when a load greater than a predetermined value is exerted on the ends thereof.

The first plunger drive member 62 has, on one side surface thereof, a rack portion 91 that meshes with the first auxiliary pinion 70, the second plunger drive member 63 has, on both side surfaces thereof, rack portions 92 and 93 that mesh with the first auxiliary pinion 70 and the second auxiliary pinion 73, and the third plunger drive member 64 has, on one side surface thereof, a rack portion 94 that meshes with the second auxiliary pinion 73.

A differential rack-and-pinion mechanism is constituted by the first auxiliary pinion 70 and second auxiliary pinion 73 of the first main drive member 50 and second main drive member 55, and by the rack portions 91, 92, 93 and 94 of the first plunger drive member 62, second plunger drive member 63 and third plunger drive member 64. That is, the first auxiliary pinion 70 and the second auxiliary pinion 73 are mounted on the first main drive member 50 and on the second main drive member 55 by torque pins 71 and 74 containing a known torque tender equipped with a brake mechanism and will not turn (rotate) unless a predetermined load is exerted thereon. In other words, the first auxiliary pinion 70 and the second auxiliary pinion 73 do not turn (rotate) unless a load greater than a predetermined value is exerted on the first plunger drive member 62, second plunger drive member 63 and third plunger drive member 64, and actuate the plunger drive members via the rack portions 91, 92, 93 and 94.

When a predetermined load is exerted on any plunger drive member (e.g., first plunger drive member 62) while the plunger drive members 62, 63 and 64 are moving forward, i.e., when a load greater than a torque required for the molding is exerted on the plunger P3, the corresponding auxiliary pinion 70 starts rotating so that the plunger drive member 62 ceases to move forward. The other plunger drive members 63 and 64 are allowed to move forward via the auxiliary pinions 70 and 73 accompanying the forward motion of the main drive members 50 and 55 until a predetermined load is exerted on each of them.

Reference numeral 72 denotes a bearing portion of the first auxiliary pinion 70 and reference numeral 75 denotes a bearing portion of the second auxiliary pinion 73.

The differential rack-and-pinion mechanism based on the auxiliary pinions 70 and 73 makes it possible to halt the plunger drive member corresponding to a plunger on which the load greater than the predetermined torque is exerted, while driving other plunger drive members.

In this embodiment, when both the first plunger drive member 62 and the second plunger drive member 63 are brought into a halt due to the load greater than the predetermined value, a load greater than the predetermined value is also exerted on the corresponding first main drive member 50. Therefore, the planetary bevel gears 25 rotate and the first driven wheel member 30 ceases to rotate. When the second plunger drive member 63 and the third plunger drive member 64 are brought into a halt due to the load greater than the predetermined value, a load greater than the predetermined value is also exerted on the corresponding second main drive member 55. Similarly therefore, the planetary bevel gears 25 rotate, and the second driven wheel member 35 ceases to rotate. Owing to the rotating/revolving motion of the planetary bevel gears 25 as described above, the first driven wheel member 30 and the second driven wheel member 35 are placed in such a relationship that when either one of them is halted, the other one continues to rotate. When a load greater than the predetermined value is exerted on both the first driven wheel member 30 and the second driven wheel member 35, the torque of the drive motor 15 is exceeded, and the operation is halted.

After the forward motion of the plungers P3, P4 and P5 has been completed, the drive motor 15 rotates in reverse, and the plungers P3, P4 and P5 move away from the metal molds T1, T2 and T3.

Mechanism for Four Metal Molds

Figure 4:
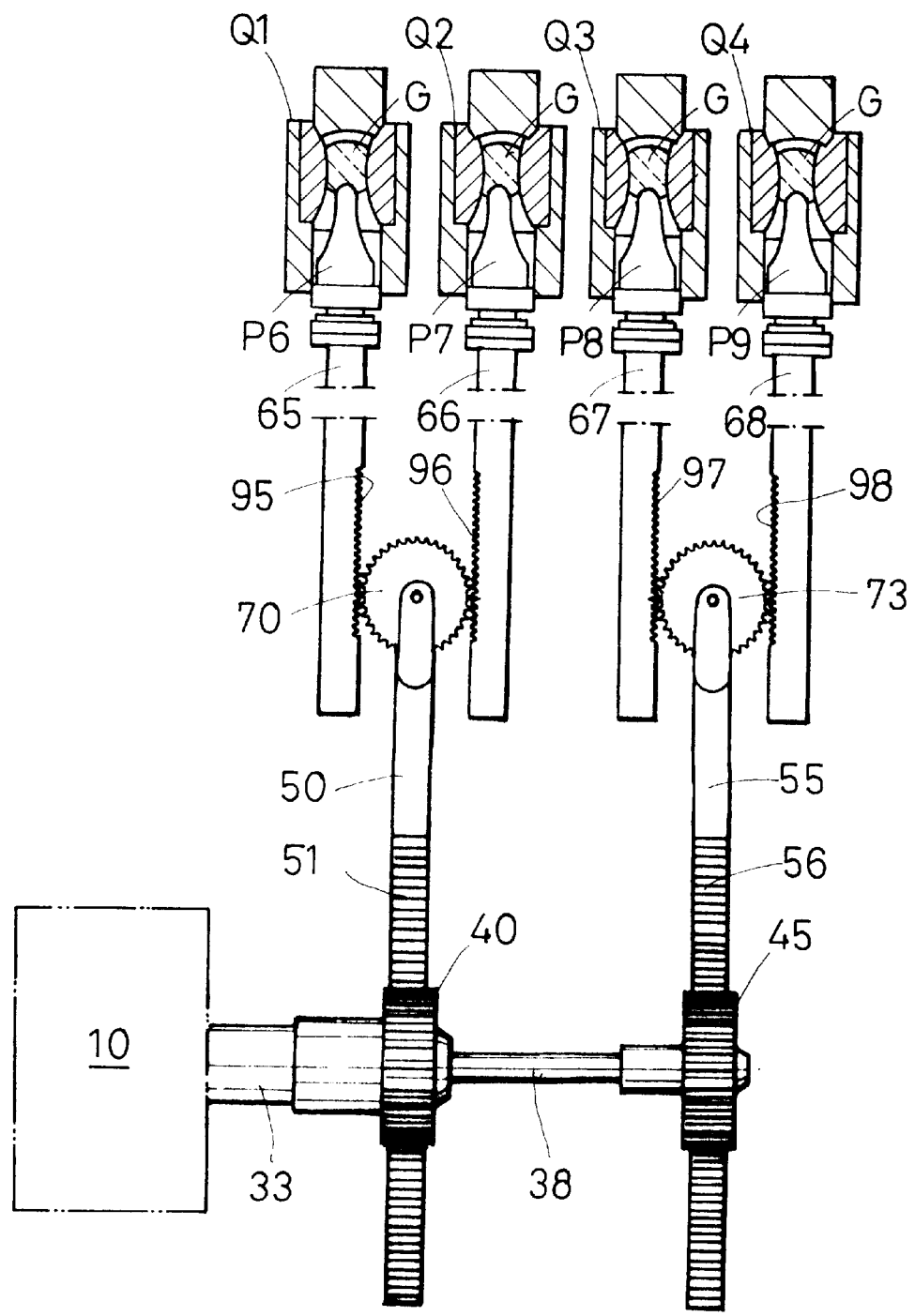
FIG. 4 is a sectional view of major portions illustrating the mechanism for driving plungers for the four metal molds.

FIG. 4 illustrates a mechanism for driving the plungers P6, P7, P8 and P9 for the four metal molds Q1, Q2, Q3 and Q4.

In the invention as shown in FIG. 4, provision is made of a first plunger drive member 65, a second plunger drive member 66, a third plunger drive member 67 and a fourth plunger drive member 68 for driving the plungers P6, P7, P8 and P9 for the four metal molds Q1, Q2, Q3 and Q4.

Furthermore, the first main drive member 50 and the second main drive member 55 in the main mechanical portion 10 are provided, at their ends, with the first auxiliary pinion 70 and the second auxiliary pinion 73 that rotate in the directions of moving forward and backward when a load greater than a predetermined value is exerted as described above in conjunction with FIG. 3.

The first auxiliary pinion 70 is so disposed as to be in mesh with a rack portion 95 of the first plunger drive member 65 and with a rack portion 96 of the second plunger drive member 66, and the second auxiliary pinion 73 is so disposed as to be in mesh with a rack portion 97 of the third plunger drive member 67 and with a rack portion 98 of the fourth plunger drive member 68.

In this embodiment, the first plunger drive member 65, second plunger drive member 66, third plunger drive member 67 and fourth plunger drive member 68 move forward and backward accompanying the forward and backward movement of the first main drive member 50 and of the second main drive member 55 in the main mechanical portion 10.

When a load greater than a predetermined value is exerted on any plunger drive member while the first plunger drive member 65, second plunger drive member 66, third plunger drive member 67 and fourth plunger drive member 68 are moving forward, i.e., when a load greater than a torque required for the molding is exerted on the plungers P6, P7, P8 and P9 for pushing the glass material G in the metal molds Q1, Q2, Q3 and Q4, the first auxiliary pinion 70 or the second auxiliary pinion 73 corresponding to the plunger drive member of the plunger rotates in the same manner as described above, so that the plunger drive member 62 ceases to move forward. The other plunger drive members are allowed to move forward via the first auxiliary pinion 70 or the second auxiliary pinion 73 accompanying the forward motion of the main drive members 50 and 55 until a predetermined load is exerted on them.

The differential rack-and-pinion mechanism based on the auxiliary pinions 70 and 73 makes it possible to halt the plunger drive member on which the predetermined load is exerted, while driving other plunger drive members. When the predetermined load is exerted on the first main operation member 50 that drives the first plunger drive member 65 and the second plunger drive member 66, or when the predetermined load is exerted on the second main drive member 55 that drives the third plunger drive member 67 and the fourth plunger drive member 68, the planetary bevel gears 25 rotate so that the first driven wheel member 30 or the second driven wheel member 35 ceases to rotate. Besides, when the load greater than the predetermined value is exerted on the first driven wheel member 30 and on the second driven wheel member, the torque of the drive motor 15 is exceeded and the operation is halted in the same manner as described above.

According to the mechanism for driving plungers of the present invention as described above in detail, when the load greater than a torque necessary for the molding is exerted on a plunger for pushing the molding material in the metal mold, the planetary bevel gears 25 rotate, or the auxiliary pinions 70, 73 and planetary bevel gears 25 rotate, so that the plunger drive members cease to move forward, while permitting the plunger drive members for other plungers to move forward until the torque necessary for the molding is exerted.

Therefore, the articles are simultaneously molded with the predetermined torque at all times despite the glass material G being thrown in varying amounts into the metal molds.

According to the present invention as described above with reference to the drawings, there is provided, as a mechanism for driving plungers, a single drive mechanism capable of simultaneously driving the plungers of a plurality of metal molds in each of the sections by employing an output cost-efficient electric motor. According to the present invention, furthermore, the articles are correctly and efficiently molded without causing defect even when the glass material is fed in varying amounts into the metal molds.

In the main mechanical portion of the invention, the drive pinions are detachably mounted on the driven wheel members, enabling the plunger drive mechanism for a single metal mold, or enabling the plunger drive mechanism for two, three or four metal molds, to be replaceably, simply and easily mounted through one-touch operation. This makes it possible to strikingly improve performance and efficiency of the mechanism for driving plungers of metal molds in a bottle-making machine of this type.

What is claimed is:

1. A mechanism for driving plungers of metal molds in a bottle-making machine in order to move the plungers forward and backward with a predetermined torque in molding a glass material thrown into the metal molds into a predetermined shape by moving the plungers forward, comprising:

a reversible drive motor so adjusted as to come into a halt upon receiving a predetermined load;

a main gear that rotates in mesh with a drive gear of said drive motor;

planetary bevel gears formed integrally with said main gear via arms, revolve in a direction in which said main gear rotates, and rotate in a direction at right angles with the direction of rotation of said main gear upon receiving a predetermined load;

a first driven wheel member which rotates in a direction in which said planetary bevel gears revolve, has a first driven bevel gear portion that meshes with said bevel gears and has a rotary shaft thereof;

a second driven wheel member arranged concentric with said first driven bevel gear portion being opposed thereto, which rotates in a direction in which said planetary bevel gear portion revolves, has a second driven bevel gear portion that meshes with said bevel gears and has a rotary shaft thereof;

a first drive pinion detachably mounted on the rotary shaft of said first driven wheel member and rotates together therewith;

a second drive pinion detachably mounted on the rotary shaft of said second driven wheel member and rotates together therewith;

a first main drive member for driving a plunger having a rack portion that meshes with said first drive pinion; and a second main drive member for driving a plunger having a rack portion that meshes with said second drive pinion.

2. A mechanism for driving plungers of metal molds in a bottle-making machine according to claim 1, wherein said first drive pinion and said second drive pinion are detachably attached, by spline fitting, to the rotary shafts of said first driven wheel member and of said second driven wheel member.

3. A mechanism for driving plungers of metal molds in a bottle-making machine according to claim 1, wherein provision is made of a stopper pin for halting the rotation of either said first driven wheel member or said second driven wheel member.

4. A mechanism for driving plungers of metal molds in a bottle-making machine according to claim 1, wherein provision is made of a first plunger drive member and a second plunger drive member for driving the plungers for two metal molds, said first plunger drive member being directly driven by said first main drive member and said second plunger drive member being directly driven by said second main drive member.

5. A mechanism for driving plungers of metal molds in a bottle-making machine according to claim 1, wherein provision is made of a first plunger drive member, a second plunger drive member and a third plunger drive member for driving the plungers for three metal molds, said first main drive member and said second main drive member having a first auxiliary pinion and a second auxiliary pinion that rotate in the directions of moving forward and backward when a predetermined load is exerted thereon, said first plunger drive member having a rack portion that meshes with said first auxiliary pinion, said second plunger drive member having a rack portion that meshes with said first auxiliary pinion and a rack portion that meshes with said second pinion, and said third plunger drive member having a rack portion that meshes with said second auxiliary pinion.

6. A mechanism for driving plungers of metal molds in a bottle-making machine according to claim 1, wherein provision is made of a first plunger drive member, a second plunger drive member, a third plunger drive member and a fourth plunger drive member for driving the plungers for four metal molds, said first main drive member and said second main drive member having a first auxiliary pinion and a second auxiliary pinion that rotate in the directions of moving forward and backward when a predetermined load is exerted thereon, said first plunger drive member having a rack portion that meshes with said first auxiliary pinion, said second plunger drive member having a rack portion that meshes with said first auxiliary pinion, said third plunger drive member having a rack portion that meshes with said second auxiliary pinion, and said fourth plunger drive member having a rack portion that meshes with said second auxiliary pinion.

* * * * *

UNITED STATES PATENT AND TRADEMARK OFFICE
CERTIFICATE OF CORRECTION

PATENT NO. :  6,170,296 B1

DATED :  January 9, 2001

INVENTOR(S) :  KAWACHI

It is certified that error appears in the above-identified patent and that said Letters Patent is hereby corrected as shown below:  On the title page:

(30) Change ``9-334179'' to --9-344179--

Signed and Sealed this

Fifteenth Day of May, 2001

Attest:

NICHOLAS P. GODICI

*Attesting Officer*    *Acting Director of the United States Patent and Trademark Office*